United States Patent [19]

Sakai et al.

[11] Patent Number: 4,571,480
[45] Date of Patent: Feb. 18, 1986

[54] FLUX CORED WIRE ELECTRODES FOR SELF-SHIELDED ARC WELDING

[75] Inventors: Yoshiya Sakai; Yasuhiro Nagai; Kazuo Ikemoto, all of Kanagawa; Tetsuo Suga, Yokohama; Masaharu Sato, Kanagawa, all of Japan

[73] Assignee: Kabushiki Kaisha Kobe Seiko Sho, Kobe, Japan

[21] Appl. No.: 583,607

[22] Filed: Feb. 27, 1984

[51] Int. Cl.⁴ .......................................... B23K 35/368
[52] U.S. Cl. .......................... 219/146.3; 219/145.22; 219/146.52
[58] Field of Search ................. 219/146.23, 146.24, 219/146.3, 146.31, 146.32, 145.22, 146.52

[56] References Cited

U.S. PATENT DOCUMENTS 4,149,063  4/1979  Bishel .......................... 219/146.3 X

FOREIGN PATENT DOCUMENTS 13442    2/1977  Japan ............................... 219/146.24
74395    6/1981  Japan ................................ 219/146.3
1396892  6/1975  United Kingdom .

Primary Examiner—C. L. Albritton
Assistant Examiner—Alfred S. Keve
Attorney, Agent, or Firm—Oblon, Fisher, Spivak, McClelland & Maier

[57] ABSTRACT

There are disclosed flux cored wire electrodes for self-shielded arc welding which comprise a steel sheath filled with a powdery flux containing as essential components thereof the following components set forth in terms of weight percentage: $BaF_2$ (25–70), alkali metal fluoride (1–30), compound oxide composed of the oxide of an alkaline earth metal selected from among Ca, Sr, and Ba and the oxide of a metal selected from among Fe, Mn, Ni, Co, Ti, Al and Zr (1–30), Al (3–12), Mg (2–10) and Mn (0.5–10).

8 Claims, 4 Drawing Figures

FLUX CORED WIRE ELECTRODES FOR SELF-SHIELDED ARC WELDING

BACKGROUND OF THE INVENTION

1. Field of the Invention

This invention relates to a flux cored wire electrode for self-shielded arc welding. More particularly, it relates to a flux cored wire electrode which is capable of providing weld metal having high toughness and free from welding defects such as pits and incomplete fusion, upon welding in any welding position.

2. Description of the Prior Art

Flux cored wire electrodes comprise a metal sheath filled with a flux. The main components of the flux generally used in said electrodes are $CaF_2$, which serves as a slag-forming and shielding agent, Al, which serves as a deoxidizing and denitrifying agent, and Mg, which serves as a deoxidizing and shielding agent. The use of such flux cored wire electrodes makes it unnecessary to separately supply a shielding gas and a flux, hence is advantageous in that an improvement in welding efficiency is produced. Furthermore, such electrodes are excellent in weather resistance and have various other advantages.

At present, however, said wire electrodes are used only in specific instances of outdoor welding in civil engineering and construction and so on. Therefore, their advantages can hardly be said to be fully enjoyable. As the reasons for such limited use and delay in their coming into wide use in other fields, there may be mentioned the following disadvantages:

(1) Slag inclusion in the weld can easily take place, especially in multilayer welding. This is so in view that MgO and $Al_2O_3$, both having a high melting point, are derived, for example, from Al, which is added as a deoxidizing and denitrifying agent, and Mg, which is added as a deoxidizing and shielding agent. Both MgO and $Al_2O_3$ constitute the main components of the resulting slag.

(2) In addition to retention of a large amount of Al in the deposited metal, crystal grains tend to become coarser as a result of extraordinary decrease in oxygen (about 50–100 ppm), so that satisfactory notch toughness cannot be obtained.

(3) The resultant slag and molten metal assume an excessively high surface tension, so that bead dripping is apt to occur in the vertical-upward position or overhead position.

(4) The optimum arc voltage range is narrow, so that strict control of the voltage and/or electrode extension is required for the elimination of pits and blowholes.

(5) Since Mg and $CaF_2$, which have high vapor pressure, are used in large amounts as flux constituents, a large amount of fume is generated and which contaminates the working environment to a considerable extent.

SUMMARY OF THE INVENTION

Accordingly, it is an object of the invention to provide flux cored wire electrodes free from the drawbacks mentioned above. Another object is to provide flux cored wire electrodes with which their characteristic weather resistance can be maximized.

The present invention provides flux cored wire electrodes comprising a steel sheath filled with a powdery flux containing, as essential components thereof, the following components:

| | |
|---|---|
| $BaF_2$: | 25–70 weight percent |
| Alkali metal fluoride: | 1–30 weight percent |
| Compound oxide composed of the oxide of an alkaline earth metal selected from the group consisting of Ca, Sr and Ba and the oxide of a metal selected from the group consisting of Fe, Mn, Ni, Co, Ti, Al and Zr: | 1–30 weight percent |
| Al: | 3–12 weight percent |
| Mg: | 2–10 weight percent |
| Mn: | 0.5–10 weight percent. |

BRIEF DESCRIPTION OF THE DRAWINGS

In the accompanying drawings.

DETAILED DESCRIPTION OF THE INVENTION

Figure 1:
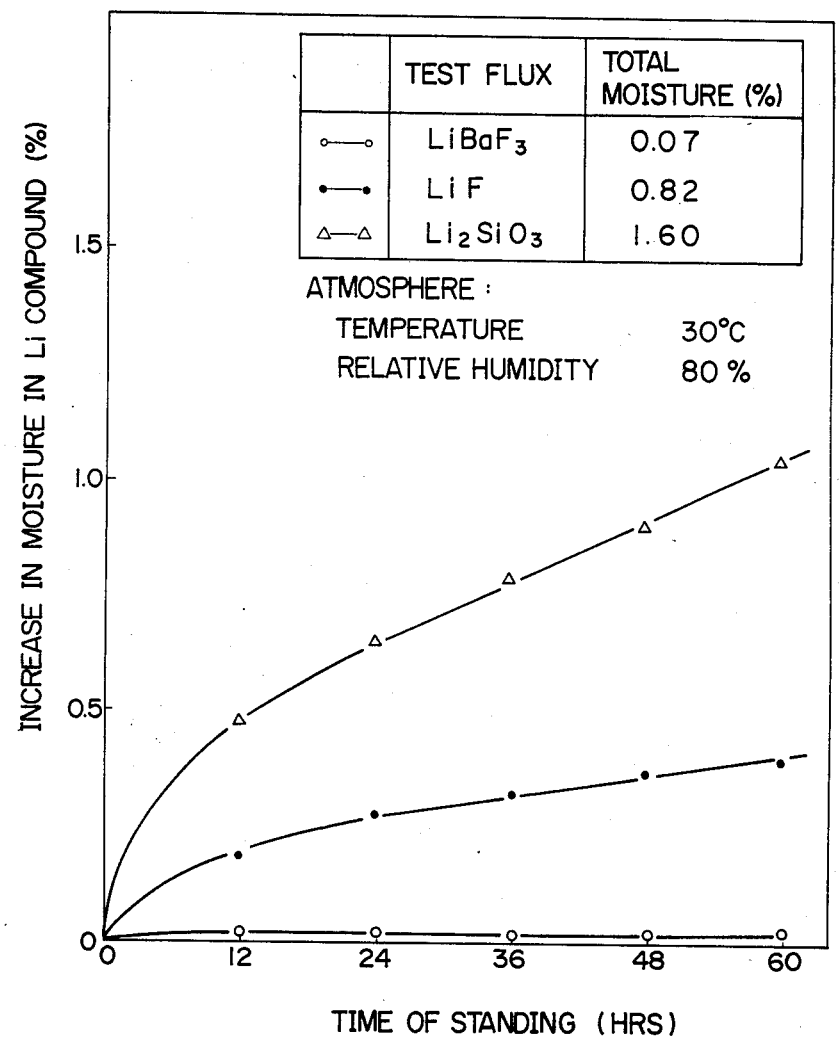
FIG. 1 is a graphic representation of the changes with time in moisture absorption by LiF, $Li_2SiO_3$ and $LiBaF_3$.

The grounds on which the components of the powdery flux according to the invention have been specified are described hereinbelow.

First, $BaF_2$ is used as a major slag-forming component in an amount of 25–70%. As compared with $CaF_2$ and $SrF_2$, which are conventional slag-forming materials, $BaF_2$ is superior in droplet migration and shielding capacity. Furthermore, $BaF_2$ can effectively prevent the dripping of molten metal in the vertically upward position. The above characteristic features become especially significant in the case of straight polarity (electrode negative) direct current arc welding. At $BaF_2$ levels lower than 25%, the use of $BaF_2$ is less effective in the above discussed aspects. More than 30% of $BaF_2$ is used to effectively attain the shielding. Conversely, at levels exceeding 70%, the slag formation becomes excessive, so that welding defects such as slag inclusion are easily formed and the welding performance is reduced.

When evaluated as a slag-forming material, $BaF_2$ has some disadvantages. $BaF_2$ has the property of making the weld penetration shallower as compared with the conventional $CaF_2$, $SrF_2$, etc. Furthermore, $BaF_2$, together with $Al_2O_3$ and MgO, which are reaction products from Al and Mg added as deoxidizing and denitrifying materials as described hereinbelow, form a high-melting point slag, so that welding defects, such as slag inclusion and incomplete fusion, are readily developed. Moreover, the luster and appearance of beads are not always good.

In order to compensate with these negative features of $BaF_2$, there are combinedly used in accordance with the invention (1) an alkali metal fluoride and (2) a compound oxide composed of an alkaline earth metal oxide and a metal oxide to be described below.

The fluoride of an alkali metal (Li, K, Na, Rb, etc.) performs the functions of adjusting the melting point and viscosity of the resultant slag, potentiating and stabilizing the arc, and thereby causing deeper penetration and inhibiting flaws such as slag inclusion and incomplete fusion from occurring. For securing these functions, an amount of not less than 1% is required. However, at addition levels exceeding 30%, the flowability of the slag becomes excessive, so that the bead appearance of the slag becomes poorer and, in the vertical or overhead welding position, the dripping of molten metal increases. Since the moisture in the flux causes pore formation in the weld metal, $Na_2ZrF_6$, $K_2SiF_6$, $Na_2SiF_6$, $Na_3AlF_6$, $Rb_2SiF_6$, $K_2TiF_6$, $K_2ZrF_6$, LiF and $LiBaF_3$, which are not very hygroscopic, are suited for use as the alkali metal fluoride. They may be used either singly or in combination. Among them, $LiBaF_3$, which is a compound alkali metal fluoride, is a flux constituent having satisfactory slag-forming, shielding, penetration-improving and arc-stabilizing effects and furthermore is characterised in that its inherent moisture content is small and that it is very sparingly hygroscopic. The use of a flux in which $LiBaF_3$ is a major constituent can prevent pore formation and other defects resulting from moisture (in other words, hydrogen), such as pits and blowholes, to the optimal extent.

FIG. 1 shows the changes with time in moisture content in LiF, $Li_2SiO_3$ and $LiBaF_3$, which are said to be relatively low in inherent moisture and hygroscopicity among alkali metal compounds. The term "inherent moisture" as used herein means the moisture content (inclusive of water of crystallization, moisture absorbed, etc.) directly after manufacture. The increments in moisture content were determined by allowing each sample to stand (30° C., 80% relative humidity) for a specified period and determining the moisture released upon heating at 1,000° C.

As is evident from FIG. 1, $LiBaF_3$ is very low in inherent moisture and hygroscopicity as compared with LiF and $Li_2SiO_3$. Therefore, the use of $LiBaF_3$ as a constituent of a flux reduces the whole hydrogen content in the flux to a low level, whereby the formation of hydrogen-caused pore defects such as pits and blowholes can be prevented to the optimal extent and accordingly the arc voltage range adequate to produce satisfactory weld zones can be widened.

Figure 2:
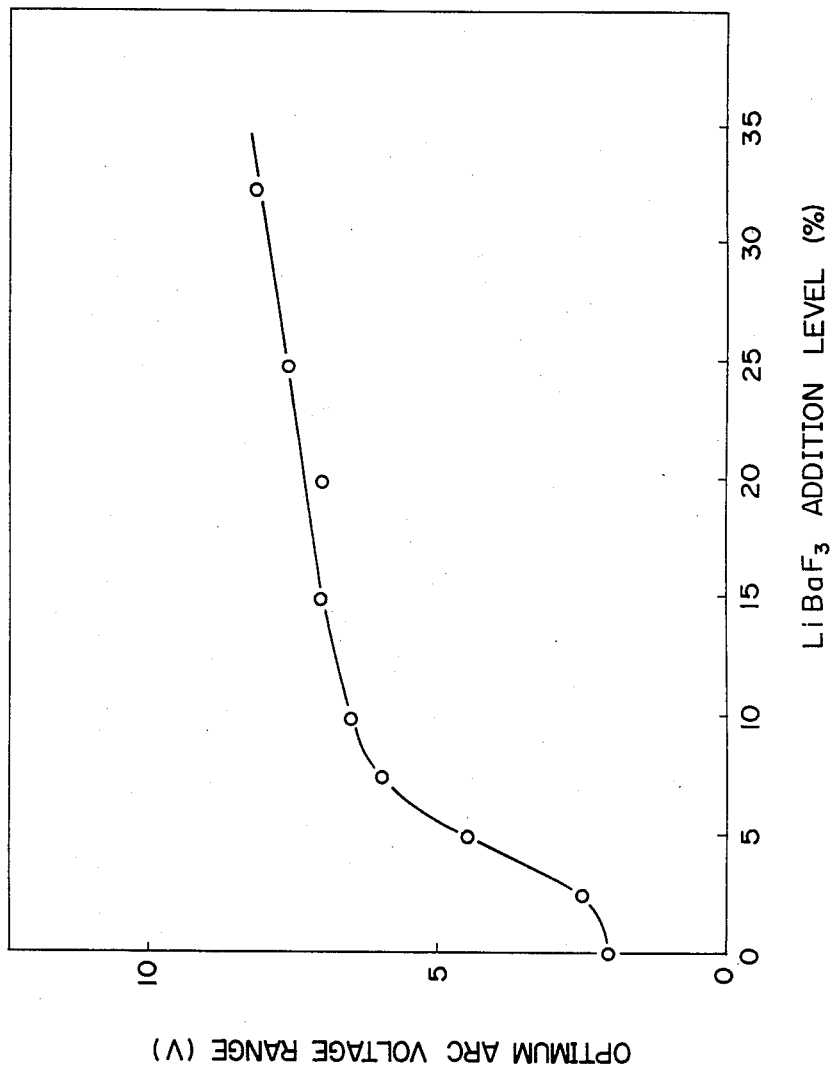
FIG. 2 is a graphic representation of the effect of $LiBaF_3$ on the optimum arc voltage range.

FIG. 2 graphically shows the results of an experiment in which flux cored wire electrodes having a diameter of 2 mm were produced by filling a mild steel sheath with a powdery flux prepared by adding 0–32% of $LiBaF_3$ to a basic composition consisting of 40% $BaF_2$, 7% Al, 8% Mg, 3.5% Mn, 0.5% CaO and the balance Fe (the amount of the flux being 20% based on the whole electrode weight), followed by drawing the sheath with the flux, and used in test welding for investigating the effect of $LiBaF_3$ on the resistance to pit formation (optimum arc voltage range). The welding conditions and test method were as follows: Welding current: 250 (A); welding speed: 20 (cm/min); current and polarity: DC, wire (−); wire extension: 25 (mm); torch angle: 0°. Flat steel sheets (JIS G 3106, SM-50, 25 mm thick × 500 mm long) were welded together in 1 pass in the flat position under the above conditions and the welds were subjected to radiography (JIS Z 3104). The voltage range in which the defects as judged from the radiographs were classifiable among type 1, class 1 was regarded as the optimum voltage range. The voltage at which the wire electrodes stuck out was regarded as the lower limit of said range.

As is evident from FIG. 2, the optimum arc voltage range increases with an increase in the level of addition of $LiBaF_3$. Incorporation of $LiBaF_3$ in an amount of 5% or more sharply enlarges the optimum arc voltage range. Addition in amounts of 10% or more preferably results in very good resistance to pit formation.

The compound oxide composed of the oxide of an alkaline earth metal selected from the group consisting of Ca, Sr and Ba and the oxide of a metal selected from the group consisting of Fe, Mn, Ni, Co, Ti, Al and Zr improves the appearance and luster of beads and increases the slag shileding effect and furthermore has the effect of improving the notch toughness by supplying the deposited metal excessively deoxidized by strong deoxidizing materials such as Al and Mg, with oxygen. Furthermore, the compound oxides composed of Sr among them has the effect of improving the arc stability. For these functions to be performed efficiently, the flux should contain the above compound oxide in an amount of not less than 1%. At levels exceeding 30%, however, droplets become excessively large, so that spatters are frequently generated in large numbers and the peelability of the slag becomes poorer.

The above-mentioned alkaline earth metal oxide easily absorbs moisture and $CO_2$ in the air and has a high melting point. Therefore, single use of the same may easily lead to welding defects such as pores and slag inclusion and to frequent and abundant spattering. In spite of the above, the formation of a compound oxide between the above two metal oxide classes gives a stable and sparingly hygroscopic compound. Furthermore, the compound oxides comprising the oxides of Fe and Mn have a lower melting point as compared with the alkaline earth metal oxides alone. The compound oxides to be used in accordance with the invention can be represented by the general formula $M_xN_yO_z$ wherein M is Ca, Sr or Ba, N is Fe, Mn, Ni, Co, Ti, Al or Zr and x, y and z are each a positive number. Typical examples of the compound oxide wherein M is Ca are $CaFe_2O_4$, $Ca_2FeO_5$, $Ca_2MnO_4$, $CaMn_2O_4$ and $CaMn_3O_{10}$, typical examples of the compound oxide in which M is Sr are $Sr_2FeO_4$, $Sr_7Fe_{10}O_{22}$, $SrFeO_{2.5}$, $Sr_2Fe_2O_5$, $Sr_3SiO_5$, $SrSiO_3$, $SrMnO_3$, $Sr_2MnO_4$, $Sr_3Mn_2O_7$, $SrNiO_3$, $SrTiO_3$, $Sr_3Al_2O_6$ and $Sr_2ZrO_4$, and typical examples of the compound oxide in which M is Ba are $BaFe_2O_4$, $Ba(MnO_4)_2$, $Ba_3NiO_4$, $BaSiO_4$, $BaSiO_3$ and $Ba_3SiO_4$. However, those compound oxides which contain Si are reduced by Al and Mg, which are strong deoxidizing agent, to give Si, which remains in the deposited metal and causes formation of coarse ferrite crystal structure and decrease in toughness. This is the reason why Si is not found among the essential elements to be used in accordance with the invention.

Al is an indispensable element as a strong deoxidizing and denitrifying material and at the same time as a nitrogen-fixing agent. It captures oxygen and nitrogen invading from the atmosphere and thereby prevents pore or pit formation. For producing such effects, Al should be present in the flux in an amount of not less than 3%. However, when Al is added at an excessively high level, an excessive amount of Al will remain in the deposited metal, making the crystals grains coarser and fragile. Accordingly, Al should be used in an amount not exceeding 12%. As the source of Al, there may be used not only metallic Al but also Al alloys such as Fe-Al, Al-Mg and Al-Li.

Mg performs the strong deoxidizing function. Furthermore, it easily gives a metal vapor upon exposure to the heat of arc and produces an excellent shielding effect. At Mg levels less than 2%, such effects cannot be produced to a satisfactory extent and, in addition, the yield of Al used combinedly decreases, whereby the denitrifying and nitrogen-fixing effects of Al are no longer produced at a satisfactory extent. Conversely, an excessive amount of Mg leads to a remarkable increase in fume generation, whereby the observation of the molten pool becomes difficult to perform and at the same time the working environment is contaminated. In addition, the quantity of spatters increases and the shielding capacity decreases due to increase in the viscosity of the slag. Therefore, Mg should be used in an amount of not more than 10%. Metallic Mg may also be used as the Mg source. Since, however, metallic Mg vaporizes in an explosive manner upon exposure to the heat of arc and thereby causes formation of a large number of spatters, it is preferable to add Mg in the form of an Mg alloy such as Al-Mg, Mg-Si, Mg-Si-Ca, Ni-Mg or Li-Mg.

Mn increases the strength of deposited metal. It also causes a reduction in the surface tension of molten metal and thereby adjusts the shape of beads. Mn should be added at least in an amount of 0.5%. However, at Mn levels exceeding 10%, the strength of the deposited metal becomes excessively high, so that the deposited metal becomes poor in ductility and resistance to cracking. As the Mn source, there may be used metallic Mn and Mn alloys such as Fe-Mn and Fe-Si-Mn. In addition, MnO, $MnO_2$ and the like oxides as well as $Li_2MnO_3$, $SrMnO_3$, $Ba(MnO_4)_2$ and the like compound oxides may also be used as the Mn source. The reason is that the flux to be used in accordance with the invention contains large amounts of those elements (Al, Mg) which have higher affinity to oxygen than to Mn and such elements deoxidize the Mn oxides to convert the same to metallic Mn.

The essential components of the flux to be used in the practice of the invention are as those mentioned hereinabove. However, for use in fields where notch toughness at low temperature (generally $-10°$ to $-60°$ C.) is required, such as in the field of offshore constructions, it is effective to further incorporate one or more of Ni (in an amount of 0.5-20%), Zr (0.1-4%), Ti (0.01-0.5%) and B (0.01-0.2%). For increasing the stability of arc, it is also effective to add the rare earth elements Ce and/or La in a total amount of 0.01-0.5%. The rare earth elements, when used in an amount of not less than 0.1%, are effective in improving the stability of arc. At addition levels less than 0.1%, they are not significantly effective in the above aspect, whereas, at levels exceeding 0.5%, adverse effects are produced. Thus, for instance, the covering of the slag decreases or marked spattering takes place. As the compounds containing said rare earth elements, there may be mentioned mixed metals and alloys, such as (Ce, La)-Fe-Si and (Ce, La)-Ca-Si, and oxides such as $CeO_2$, $Ce_2O_3$ and $La_2O_3$. In the following, brief mention is made of such secondary additives.

Ni is an austenite-forming element and has the effect of increasing the notch toughness of deposited metal by inhibiting the coarsening of ferrite crystal grains resulting from retention of a large amount of Al. Such effect is efficiently produced at an addition level of not less than 0.5%. However, at addition levels exceeding 20%, the strength becomes excessive and the resistance to cracking becomes poor. As the Ni source, there may be mentioned metallic Ni as well as Ni alloys, such as Fe-Ni-Cr and Ni-Mg, and oxides and compound oxides of Ni, such as NiO and $Ba_2NiO_4$.

Figure 3:
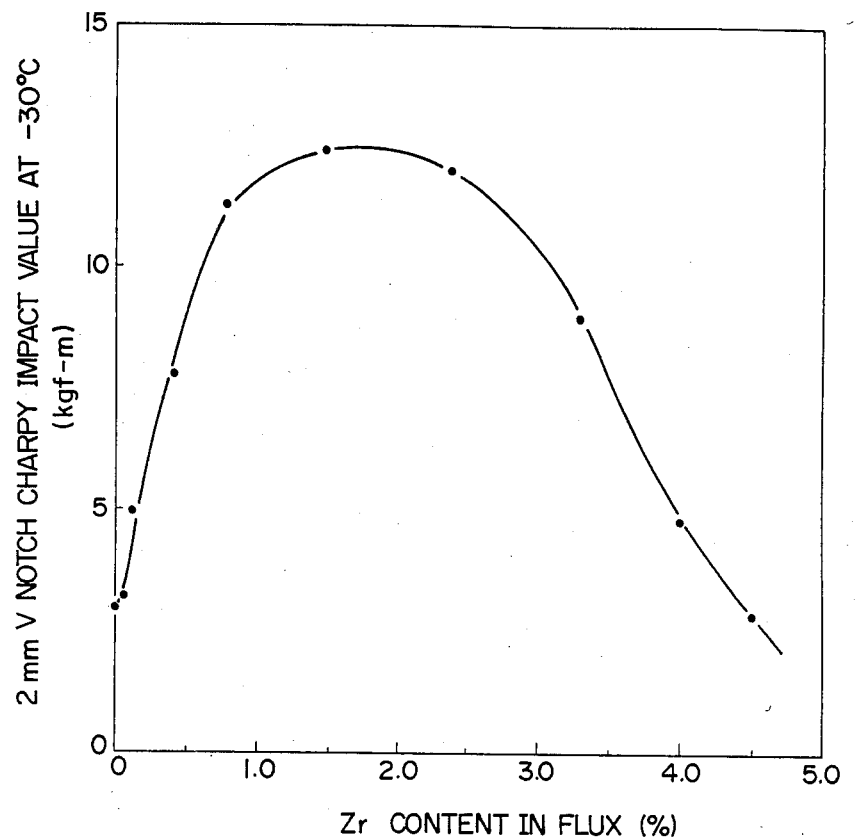
FIG. 3 is a graphic representation of the effect of Zr on the notch toughness of the weld.

Zr possesses the effect of improving the notch toughness of deposited metal by making crystal grains finer and fixing the invading nitrogen. This effect is produced efficiently at an addition level of not less than 0.1%. When the addition level exceeds 4%, the burning/adhesion of slag becomes remarkable, whereby the peelability is worsened. Moreover, the notch toughness rather decreases. FIG. 3 is a graphic representation of the relationship between the Zr content in the flux and the notch toughness as revealed in an experiment in which flux cored wire electrodes were produced by drawing a mild steel sheath filled with a powdery flux prepared by adding 0.1-5% of Zr in the form of Fe-Zr (Zr: 30%) to a base composition consisting of 50% $BaF_2$, 3.5% LiF, 6% $SrMnO_3$, 9.2% Al, 7% Mg, 0.2% Mn, 5% Ni and the balance Fe, to a diameter of 1.6 mm and used in experimental welding. The welding conditions were as follows:

| Test conditions: | |
|---|---|
| Base metal: | SM-50A, sheet thickness 19 mm |
| Welding position: | flat position, 7 layers, 13 passes |
| Welding current: | 250 A, DC (−) |
| Welding voltage: | 21 V |
| Welding speed: | 15-22 cm/minute |
| Wire extension: | 25 mm |
| Notch toughness test: | 2 mm V notch Charpy test according to JIS Z 3112. |

As is evident from FIG. 3, the addition of 0.1-4% of Zr to the flux improved the notch toughness and, especially when 0.5-3% of Zr is added, the improvement is remarkable. As the Zr source, there may be mentioned alloys such as Fe-Zr and Zr-Si, fluorides such as $K_2ZrF_6$ and $Na_2ZrF_6$, and oxides and compound oxides such as $ZrO_2$, $ZrSiO_4$(zircon sand) and $Li_2ZrO_3$.

Ti, in very small amounts, is effective in increasing the notch toughness. The effect is produced efficiently at an addition level of not less than 0.01%. In this case, the use of Zr in the above-mentioned addition level range and/or 0.01-0.2% of B in combination with Ti can make the above effect more significant. However, when the addition level of Ti exceeds 0.5%, the adhesion of burnt slag becomes persistent and the appearance of beads and the welding performance become worsened. As the Ti source, there may be used not only metallic Ti and alloys such as Fe-Ti but also oxides such as $TiO_2$ and $Ti_2O_3$ and compound oxides such as $Li_2TiO_3$, $CaTi_2O_4$ and $CaTiO_3$.

When used alone, B is little effective in improving the notch toughness. However, when used in combination with an appropriate amount of Ti, B potentiates the effect of Ti, as mentioned above. While such effect is efficiently producible at an addition level of not less than 0.01%, the addition of B in escess of 0.2% leads to decrease in resistance to cracking due to hardening and to decrease in notch toughness. As the source of B, there may be mentioned alloys such as Fe-B, oxides such as $B_2O_3$, and compound oxides such as $Li_2B_4O_7$ and $Na_2B_4O_7$.

The flux may further contain, as slag-forming agents added either singly or in combination, oxides such as $Al_2O_3$, MgO, FeO, $Fe_2O_3$, $Na_2O$, $K_2O$, $LiFeO_2$, $Li_2MnO_3$, $Li_2SiO_3$ and $SiO_2$, fluorides other than the alkali metal fluorides, such as $CaF_2$, $SrF_2$, $MgF_2$, $BaSiF_6$, $AlF_3$, $MnF_2$, $CeF_3$ and $LaF_3$, and carbonates such as $Li_2CO_3$, $NA_2CO_3$, $BaCO_3$, $CaCO_3$, $MgCO_3$, $SrCO_3$ and $MnCO_3$, each in an amount not causing slag inclusion or decrease in welding performance, preferably in a total amount (inclusive of the above-mentioned slag-forming materials, namely $BaF_2$, alkali metal fluoride and compound oxide composed of the oxide and an alkaline earth metal selected from among Ca, Sr and Ba and the oxide of a metal selected from among Fe, Mn, Ni, Co, Ti, Al and Zr) of not more than 18% based on the whole wire weight. For improving mechanical properties, such as hot strength, and corrosion resistance of the deposited metal, there may also be added such elements as Cr, Mo, Cu, Nb, V, Co and P. Furthermore, iron powder may also be added for increasing the deposition rate or for improving the flowability of the powdery flux in the step of filling a steel sheath therewith in the manufacture of wire electrodes.

In the foregoing, the description has been focused on the composition of the flux for use in filling steel sheaths therewith. Another very important factor for efficiently producing the effects of the respective components is the rate of filling with flux. The rate of filling should be selected within the range of 15–30% based on the whole wire weight. If the rate of filling is less than 15%, the contents of the respective flux constituents specified hereinabove become insufficient, hence satisfactory effects cannot be obtained. On the other hands, at a rate of filling exceeding 30%, the deposited metal becomes excessively abundant in Al and other alloys and consequently intended mechanical properties cannot be obtained in some cases and, in other cases, the amount of the resultant slag becomes excessive, whereby problems are encountered, such as marked slag inclusion or decrease in welding performance.

The most common material of the sheath is mild steel. Depending on the intended use, low alloy steels and high alloy steels may also be used. The sectional structure of the slag is not particularly limited although the relatively simple cylinderical form is generally used in cases where the wire diameter is 2 mm or less and a structure made by tucking in the sheath in a complicated manner is generally used for manufacturing wire electrodes having a larger diameter of about 2.4–4 mm.

In the foregoing, the constitution of the present invention has been outlined. As a result of selecting specific components as the constituents of the flux to be filled in steel sheaths, it is now possible to provide flux cored wire electrodes for self-shielded arc welding which can give, in any welding position, excellent weld metals free from welding defects such as pits and incomplete fusion and having good mechanical properties (especially toughness).

The following examples illustrate the effects of the present invention.

EXAMPLES

A steel sheath having the chemical composition shown in Table 1 was filled with a powdery flux having the composition shown in Table 2 (filling rate: 20%) and drawn to give a flux cored wire electrode having a diameter of 2 mm.

Using each wire electrode thus obtained, experimental welding was performed under the conditions given below. The results obtained are shown in Table 3.

Figure 4:
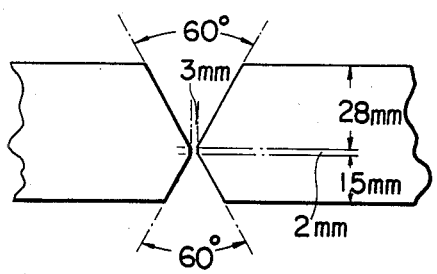
FIG. 4 illustrates the groove employed in some welding experiments.

| Welding conditions: | |
|---|---|
| Test sheets: | JIS G 3106, SM-50A, 45 mm thick × 500 mm long |
| Shape of groove: | X (FIG. 4) |
| Welding current: | 250 (A), DC [wire (−)] |
| Welding voltage: | 21–22 (V) |
| Welding speed: | 13–24 (cm/minute) |
| Wire extension: | 20–25 (mm) |
| Method of building up: | 8 layers and 14 passes for each of the face and back |
| Welding position: | flat position |
| Back chipping: | mill scale removal with a grinder after arc air gouging |
| Testing methods: | |
| Tensile test: | JIS Z 3111 |
| Impact test: | JIS Z 3112 |
| Side bend test: | JIS Z 3122 |
| Ultrasonic test: | JIS Z 3060 |

Table 1 Composition of steel sheath

| C | Si | Mn | P | S |
|---|---|---|---|---|
| 0.05 | 0.01 | 0.42 | 0.007 | 0.010 |

(weight percent; the balance being Fe and unavoidable impurities)

As is evident from Table 2 and Table 3, the deposited metals obtained in a smooth manner by using the wire electrodes (Nos. 1–7) which met the requirements according to the invention were free of defects, such as blowholes, slag inclusion and incomplete fusion, and had good mechanical properties. In particular, the deposited metals obtained by using the wire electrodes (Nos. 6 and 7) with appropriate amounts of Ti and Zr added to the fluxes and the wire electrode (No. 3) with Ti and B added to the flux exhibited excellent notch toughness at low temperature (−30° C.). On the contrary, the wire electrodes for comparison which failed to meet any of the requirements according to the invention gave deposited metals inferior in at least one of the welding performance, ultrasonic test results and mechanical properties and thus failed to accomplish the objects of the invention.

TABLE 2

| Wire electrode No. | Flux composition (%) | | | | | | | | | | | | |
|---|---|---|---|---|---|---|---|---|---|---|---|---|---|
| | $BaF_2$ | LiF | $K_2SiF_6$ | $LiBaF_3$ | $CaFeO_4$ | $Sr_2FeO_4$ | $Li_2MnO_3$ | Al | Al—Mg (Mg 60%) | Mn | Ni | Fe—Zr (Zr 30%) | $ZrSiO_4$ |
| 1 (Invention) | 45 | — | 5 | — | — | 8 | — | 3.5 | 12 | 3 | — | — | — |
| 2 (Invention) | 70 | — | 1 | — | — | — | — | 7 | 3.4 | " | — | — | — |
| 3 (Invention) | 25 | — | — | 8 | — | 30 | 3 | 6 | 9 | 1.6 | 4 | — | — |
| 4 (Invention) | 32 | 10 | — | 20 | 5 | — | — | 3.5 | 12 | 3 | " | — | — |
| 5 (Invention) | 45 | 10 | — | — | — | 1 | — | " | " | " | " | — | — |
| 6 (Invention) | " | — | — | 7 | — | 8 | — | " | " | " | " | — | 1.5 |
| 7 (Invention) | " | — | — | " | — | " | — | " | " | " | " | 2.5 | — |
| 8 (for comparison) | 56 | 3 | — | — | — | — | — | " | 14 | " | 5 | — | — |
| 9 (for comparison) | 54 | 2 | — | — | — | — | — | " | 9 | " | — | — | 3 |
| 10 (for comparison) | 55 | 0.5 | — | — | — | 1 | — | " | 12 | " | 4 | — | — |

TABLE 2-continued

| | | | | | | | | | | | | | |
|---|---|---|---|---|---|---|---|---|---|---|---|---|---|
| 11 (for comparison) | 44 | 32 | — | — | — | " | — | " | " | " | " | — | — |
| 12 (for comparison) | 55 | — | 5 | — | — | 0.5 | — | " | " | " | " | — | — |
| 13 (for comparison) | 44 | — | " | — | — | 32 | — | " | " | " | " | — | — |
| 14 (for comparison) | 45 | — | 5 | — | — | 8 | — | 7 | 15 | " | 4 | — | — |

| Wire electrode No. | Flux composition (%) | | | | | | | | Fe and impurities | Total |
|---|---|---|---|---|---|---|---|---|---|---|
| | Fe—Ti (Ti 40%) | TiO$_2$ | Al$_2$O$_3$ | MgO | FeO | SiO$_2$ | CaCO$_3$ | B | | |
| 1 (Invention) | — | — | — | 3 | 3 | — | — | — | 17.5 | 100.0 |
| 2 (Invention) | — | — | — | 5 | " | — | — | — | 0.6 | " |
| 3 (Invention) | 0.5 | — | — | — | 4 | — | — | 0.2 | 8.7 | " |
| 4 (Invention) | — | — | 2 | 2 | — | — | — | — | 6.5 | " |
| 5 (Invention) | — | — | " | " | — | — | — | — | 7.5 | " |
| 6 (Invention) | — | 0.3 | " | " | 2 | — | — | — | 9.7 | " |
| 7 (Invention) | 0.2 | — | — | " | " | — | — | — | 10.8 | " |
| 8 (for comparison) | — | — | — | — | 8 | 2 | 4 | — | 1.5 | " |
| 9 (for comparison) | 3 | — | — | — | 15 | " | 2 | 0.2 | 6 | " |
| 10 (for comparison) | — | — | — | — | — | — | — | — | 21 | " |
| 11 (for comparison) | — | — | — | — | — | — | — | — | 0.5 | " |
| 12 (for comparison) | — | — | — | — | — | — | — | — | 21 | " |
| 13 (for comparison) | — | — | — | — | — | — | — | — | 0.5 | " |
| 14 (for comparison) | — | — | — | — | — | — | — | — | 13 | " |

TABLE 3

| Wire electrode No. | Chemical composition of deposited metal (%) | | | | | | | | | Mechanical properties of deposited metal[1] | | | | |
|---|---|---|---|---|---|---|---|---|---|---|---|---|---|---|
| | C | Si | Mn | P | S | Al | Ni | Zr | Ti | Yield point (Kgf/m$^2$) | Tensile strength (Kgf/m$^2$) | Elongation (%) | Impact value (Kgf-m) Test temperature | |
| | | | | | | | | | | | | | 0° C. | −30° C. |
| 1 (Invention) | 0.05 | 0.13 | 0.94 | 0.007 | 0.002 | 0.62 | 1.42 | — | — | 45.2 | 56.9 | 30 | 10.1 | 4.2 |
| 2 (Invention) | 0.04 | 0.06 | 0.92 | 0.008 | 0.001 | 0.41 | — | — | — | 40.1 | 50.6 | 35 | 7.6 | — |
| 3 (Invention) | 0.05 | 0.04 | 0.90 | 0.008 | 0.003 | 0.52 | 0.82 | — | 0.03 | 44.6 | 55.2 | 29 | 10.0 | 8.2 |
| 4 (Invention) | 0.04 | 0.03 | 0.93 | 0.007 | 0.003 | 0.88 | 0.83 | — | — | 43.8 | 54.2 | 30 | 10.8 | 3.6 |
| 5 (Invention) | 0.05 | 0.04 | 0.90 | 0.008 | 0.001 | 0.92 | 0.85 | — | — | 44.0 | 55.1 | 29 | 9.6 | 3.8 |
| 6 (Invention) | 0.04 | 0.05 | 0.87 | 0.007 | 0.002 | 0.64 | 0.81 | 0.01 | 0.02 | 42.9 | 53.8 | 32 | 18.2 | 10.5 |
| 7 (Invention) | 0.05 | 0.04 | 0.91 | 0.008 | 0.002 | 0.66 | 0.83 | 0.02 | 0.02 | 43.1 | 54.6 | 30 | 19.1 | 14.2 |
| 8 (for comparison) | 0.10 | 0.14 | 0.89 | 0.007 | 0.001 | 0.70 | 1.04 | — | — | 47.3 | 58.6 | 17 | 4.9 | 2.1 |
| 9 (for comparison) | 0.07 | 0.15 | 0.91 | 0.007 | 0.003 | 0.61 | — | 0.03 | 0.02 | 40.1 | 51.6 | 20 | 11.5 | 4.0 |
| 10 (for comparison) | 0.04 | 0.03 | 0.92 | 0.007 | 0.003 | 0.90 | 0.81 | — | — | 46.0 | 57.8 | 18 | 6.9 | 3.2 |
| 11 (for comparison) | 0.05 | 0.05 | 0.89 | 0.008 | 0.001 | 0.98 | 0.85 | — | — | 44.2 | 55.6 | 30 | 2.9 | 1.1 |
| 12 (for comparison) | 0.04 | 0.03 | 0.87 | 0.008 | 0.004 | 0.90 | — | — | — | 39.7 | 50.4 | 32 | 2.6 | 0.8 |
| 13 (for comparison) | 0.04 | 0.03 | 0.90 | 0.007 | 0.001 | 0.56 | — | — | — | 40.0 | 50.8 | 29 | 7.7 | 4.8 |
| 14 (for comparison) | 0.05 | 0.05 | 0.95 | 0.009 | 0.002 | 1.43 | 0.85 | — | — | 42.1 | 56.2 | 22 | 1.1 | — |

| Wire electrode No. | Side[2] bend test (n = 2) | Ultrasonic[3] test Defects | | Welding performance[4] | | | | | |
|---|---|---|---|---|---|---|---|---|---|
| | | | | Flat position | | | Vertical ascending position | | |
| | | Blowholes | Slag inclusion, incomplete fusion | Appearance and shape of beads | Quantity of spatters | Slag peelability | Appearance and shape of beads | Quantity of spatters | Slag peelability |
| 1 (Invention) | No defects | None | None | ⊚ | ⊚ | ⊚ | ⊚ | ⊚ | ⊚ |
| 2 (Invention) | No defects 0.5 mm defect | 1 | " | ⊚ | ○ | ⊚ | ○ | ○ | ○ |
| 3 (Invention) | No defects 0.5 mm defect | None | " | ⊚ | ○ | ○ | ○ | ○ | ○ |
| 4 (Invention) | No defects 0.5 mm defect | " | " | ⊚ | ○ | ○ | ○ | ○ | ○ |
| 5 (Invention) | No defects | " | " | ⊚ | ⊚ | ⊚ | ⊚ | ○ | ○ |

TABLE 3-continued

| | | | | | | | | | |
|---|---|---|---|---|---|---|---|---|---|
| 6 (Invention) | 0.5 mm defect No defects | " | " | ⊙ | ⊙ | ○ | ⊙ | ⊙ | ○ |
| 7 (Invention) | 0.5 mm defect No defects | " | " | ⊙ | ⊙ | ○ | ⊙ | ⊙ | ○ |
| 8 (for comparison) | 0.5 mm defect 10 mm defect Breakage | 4 | 112 mm | ○ | Δ | ⊙ | ○ | Δ | ⊙ |
| 9 (for comparison) | Many defects Breakage | 8 | 220 mm | ⊙ | Δ | ⊙ | ⊙ | Δ | ⊙ |
| 10 (for comparison) | Breakage | None | 180 mm | Δ | ⊙ | ⊙ | Δ | ⊙ | ⊙ |
| 11 (for comparison) | No defects | " | " | ○ | Δ | Δ | Δ | Δ | Δ |
| 12 (for comparison) | 3 mm defect No defects | 3 | 1 mm | Δ | ⊙ | ⊙ | Δ | ⊙ | ⊙ |
| 13 (for comparison) | 0.5 mm defect No defects | 2 | None | ○ | Δ | Δ | Δ | Δ | Δ |
| 14 (for comparison) | No defects 0.3 mm defect | None | 12 mm | ⊙ | ⊙ | ⊙ | ⊙ | ⊙ | ⊙ |

*[1] Tensile test pieces: subjected to aging treatment at 100° C. for 24 hours after mechanical processing but prior to testing.
*[2] Side bend test: bending angle 180°, bending diameter 19 mm
*[3] Ultrasonic test: for blowholes, total number; for slag inclusion and incomplete fusion, total length.
*[4] Evaluation of welding performance: ⊙ excellent; ○ good; Δ poor
Welding current × welding voltage: Flat position: 250 A × 21 V Vertical position: 170 A × 20 V.
Other conditions were the same as those in joint welding in flat position.

What is claimed is:

1. A flux cored wire electrode for self-shielded arc welding which comprises a steel sheath and a powdery flux containing as essential components the components given below, said sheath being filled with said flux and the amount of said flux being 15–30 percent by weight based on the whole wire electrode weight:

| | |
|---|---|
| $BaF_2$: | 25–70 percent by weight |
| Alkali metal fluoride: | 1–30 percent by weight |
| Compound oxide composed of the oxide of an alkaline earth metal selected from the group consisting of Ca, Sr and Ba and the oxide of a metal selected from the group consisting of Fe, Mn, Ni, Co, Ti, Al and Zr: | 1–30 percent by weight |
| Al: | 3–12 percent by weight |
| Mg: | 2–10 percent by weight |
| Mn: | 0.5–10 percent by weight. |

2. A flux cored wire electrode as set forth in claim 1, wherein the alkali metal fluoride comprises at least one member selected from the group consisting of $Na_2ZrF_6$, $K_2SiF_6$, $Na_2SiF_6$, $Na_3AlF_6$, $Rb_2SiF_6$, $K_2TiF_6$, $K_2ZrF_6$, LiF and $LiBaF_3$.

3. A flux cored wire electrode as set forth in claim 2, wherein the alkali metal fluoride is $LiBaF_3$.

4. A flux cored wire electrode as set forth in claim 3, wherein the flux contains $LiBaF_3$ in an amount of not less than 5%.

5. A flux cored wire electrode as set forth in claim 3, wherein the flux contains $LiBaF_3$ in an amount of not less than 10%.

6. A flux cored wire electrode as set forth in claim 1, wherein the flux further contains at least one metal selected from the group consisting of Ni in an amount of 0.5–20%, Zr in an amount of 0.1–4%, Ti in an amount of 0.01–0.5% and B in an amount of 0.01–0.2%.

7. A flux cored wire electrode as set forth in claim 1, wherein the flux contains at least one rare earth element selected from the group consisting of Ce and La in a total amount of 0.01–0.5%.

8. A flux cored wire electrode as set forth in claim 6, wherein the flux contains Zr in an amount of 0.5–3%.

* * * * *